E. SUTHERLAND.
SPRAYING DEVICE.
APPLICATION FILED MAY 20, 1910.
1,004,709.
Patented Oct. 3, 1911.
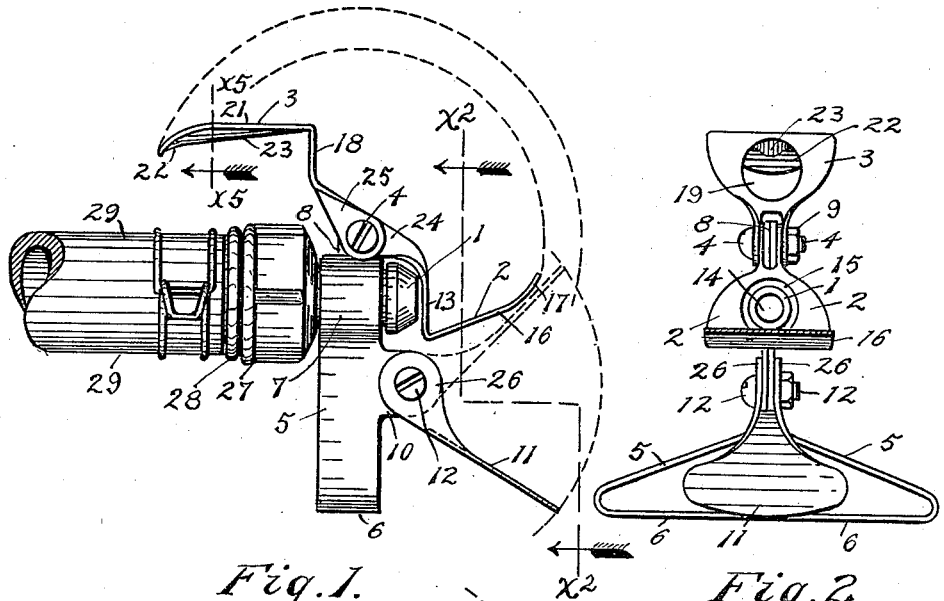
Fig.1.　Fig.2.
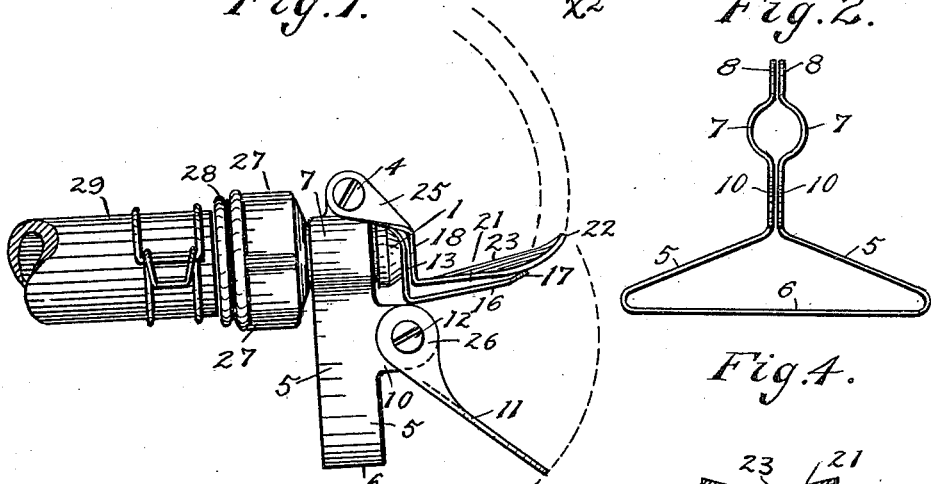
Fig.3.　Fig.4.
Fig.5.
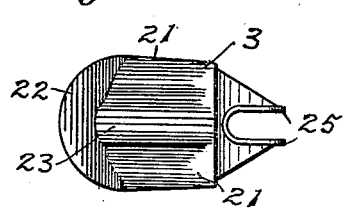
Fig.6.
Witnesses:
H. H. Hunt.
Philip B. Hasbrouck.
Inventor:
Emil Sutherland
By Albert H. Merrill
atty.
COLUMBIA PLANOGRAPH CO., WASHINGTON, D. C.

UNITED STATES PATENT OFFICE.

EMIL SUTHERLAND, OF LOS ANGELES, CALIFORNIA, ASSIGNOR TO ALBERT E. YERKES, OF LOS ANGELES, CALIFORNIA.

SPRAYING DEVICE.

1,004,709. Specification of Letters Patent. Patented Oct. 3, 1911.

Application filed May 20, 1910. Serial No. 562,510.

*To all whom it may concern:*

Be it known that I, EMIL SUTHERLAND, residing in the city of Los Angeles, State of California, have invented a new and useful Spraying Device, of which the following is a specification.

Among the objects of this invention are to provide improved means for so distributing the spray that the sprayed area will be bounded on one side by a straight line, thus adapting the device for spraying a lawn effectively and without wasting water on the side walk or other outside area.

Another object is to provide a plurality of spraying plates connected with the device in an improved manner and each adapted to distribute a different spray from the other.

A further object is to provide a spraying plate adapted to be adjusted to a position in which it coöperates with the supporting legs of the device to form a tripod upon which a nozzle may be supported and adjusted to vary the upward inclination thereof.

Other objects, for example, simplicity of construction and low cost manufacture, will hereinafter appear.

Referring to the accompanying drawings, which illustrate the invention, Figure 1 is a side elevation of the device with the spraying plates in one position. Fig. 2 is a front elevation with one of the spraying plates sectioned on line x 2 of Fig. 1. Fig. 3 is a side elevation showing the spraying plates in a different position. Fig. 4 is an elevation of the supporting means. Fig. 5 is a cross section on line x 5 of Fig. 1. Fig. 6 is a plan view of the spraying plate designed to throw the spray so that one side of the sprayed area will be straight.

Referring in detail to the drawings,—at one side of a nozzle 1 is pivotally attached a plurality of superimposable, overhanging spraying plates 2 and 3 which are attached to said nozzle by a common pivot 4.

Various means may be used to support the nozzle and to pivotally connect said overhanging plates thereto. As shown in the drawings the nozzle is supported by a pair of corresponding legs 5 which are desirably united at their lower ends by a crosspiece 6. Each of said legs has a correspondingly outcurved portion 7 which rotatably supports the nozzle, said legs being held together and against the neck portion of the nozzle by the pivot screw 4 which projects through the upward extensions 8 of the legs and is provided with a nut 9. Said legs may also be furnished with a forwardly projecting lug 10 to which is pivoted the lower spraying plate 11 by means of a screw or rivet 12, said rivet assisting in holding the legs together. Said lower plate 11 may be turned up to the position shown in dotted lines in Fig. 1 for use as a spraying plate, but when not so used it may be turned down to the position shown in Fig. 3, in which position it coöperates with the legs 5 to form a tripod which may be adjusted by moving the plate 11 to support the nozzle at different angles.

Referring again to the overhanging plate 2, said plate has an apertured portion 13 adapted to extend across the discharge opening 14 of the nozzle and having an aperture 15 somewhat larger than the opening 14 of the nozzle. Said apertured portion 13 of the plate 2 is adapted, when the plate occupies the overhanging position shown in Fig. 1, to extend across the discharge opening of the nozzle and to allow the stream from the nozzle to pass through the opening 15 in the plate and impinge upon the inclined spraying portion 16 of the plate. The plate is desirably provided with an upturned tip portion 17 in order to distribute the spray more widely.

On the pivot 4 is also mounted the spraying plate 3 already referred to, said plate being adapted for turning down to the overhanging position shown in Fig. 3 where the plate is superimposed upon plate 2. Plate 3 is in some respects similar to plate 2, being likewise provided with an angularly bent portion 18 adapted to extend in front of the nozzle, said portion having an opening 19 through which the stream may pass. Plate 3, like plate 2, has an intermediate inclined portion 21 and an upturned lip 22. Plate 3 differs, however, from plate 2 in that it is provided with a bead 23 which extends along the mid-width of said inclined intermediate portion from a point near the aperture 19 toward said deflected portion 22. When the overhanging plate 3 is in the operative position the bead 23 will spread the stream laterally and in doing so will coöperate with the rounded upturned lip 22 to cause the forward edge of the area being sprayed to extend along a straight line.

Plates 2 and 3 may respectively be provided with flanges 24 and 25 for attaching them to the pivot 4. The plate 11 may have attaching flanges 26. Said plate is adapted to throw the spray over a wider area than are the overhanging plates when the latter are shaped as shown in the drawings.

The nozzle may be provided with the usual female section 27 and male section 28, the latter being attached to the hose 29.

The invention, when embodied in the appliance which has been illustrated and described is adapted to throw a three-fold character of spray; but it is to be understood that if preferred the appliance may be constructed with only one or two of the spraying blades illustrated.

When the plate 11 is used it may be adjusted to vary the inclination of the nozzle and thus assist in regulating the distance to which the stream will be thrown if no other spraying plate is used and the stream delivered unmodified; or it may thus assist in regulating the distribution of the spray delivered from either of the hanging plates.

It will be understood that when the overhanging plate 3 is superimposed upon the other plate in the operative position, the stream will pass through opening 15 of plate 2 as well as through the opening 19 in plate 3.

The intermediate portion 21 of plate 3 slopes downward (when said plate is in the operative position) from each side of the bead 23. The inclination of the tip portion 22 extends farthest back (see Fig. 3) near the edges of the plate. This shape of plate is adapted to properly diffuse the spray and throw the forward portion thereof along a straight line.

The invention is broadly new in respect to a plate having an aperture extending transversely therethrough through which the stream is projected against a deflected spraying portion of the same plate.

In the present embodiment of the invention the upper sections 7 of the support form a stop to limit the downward movement of the lower apertured plate 16, it being impossible for said plate to be displaced by the impact of the stream.

I claim:

1. A support, a plate having an aperture extending transversely therethrough, and a spraying portion, said support being adapted to support a nozzle in position to direct a stream through said apertured portion of said plate and against the spraying portion thereof.

2. In a sprinkler, a nozzle, a spraying plate, means to pivotally attach said plate to one side of said nozzle, said plate having a spraying portion, such spraying portion tending under the impact of the liquid to move the plate toward the side of the nozzle opposite the pivotal mounting thereof, and stop means to limit such movement.

3. In a sprinkler, a nozzle, a plate having an apertured portion and a spraying portion, means to support said plate with the apertured portion thereof extending across the mouth of the nozzle and to permit a stream to pass from the nozzle through said apertured portion of the plate without deflection, said plate being bent upon the said apertured portion to bring the spraying portion thereof into the path of the stream.

4. In combination, a nozzle, a plurality of spraying members, and a pivotal support common to said members, one of said members being adapted to form a different spray from the other, said members being superimposable and successively movable to a spraying position.

5. In combination, a nozzle, a plurality of spraying plates, and a pivotal support common to said plates, each of said plates having an apertured portion adapted to extend across the mouth of the nozzle and a spraying portion adapted to deflect the stream.

6. A nozzle, supporting legs therefor, said legs having separable portions, a spraying plate, and combined means for attaching said plate and clamping said separable portions of said legs together and against each side of the nozzle to form a support therefor.

7. A nozzle, supporting legs therefor having extensions projecting thereabove, and a spraying plate pivoted to said extensions, each of said legs being inbent to support said nozzle, and a nut on the pivot of the spraying plate to hold said inbent portions of the legs under the nozzle to support the same.

8. A nozzle, legs having each an outcurved portion adapted to support said nozzle and an extension projecting above said portion, a part securing said extension together and clamping said outcurved portions of the legs against the nozzle to support the same, and a spraying plate pivoted to said part.

9. A nozzle, a support therefor having an extension projecting thereabove, and a plate pivoted to said extension, said plate having an apertured portion adapted to overhang the mouth of said nozzle and a spraying portion adapted to deflect a stream delivered through said apertured portion.

10. A nozzle support and sprayer, comprising upstanding nozzle-embracing legs, a securing device passing transversely through the legs, and a sprayer plate pivotally mounted on the securing device.

11. A nozzle support and sprayer, comprising upstanding nozzle-embracing legs, one of which has an ear located in a plane that is disposed longitudinally of a nozzle embraced by the legs, a pivot device passing transversely through the ear and arranged transversely of such nozzle, and a sprayer plate pivotally mounted on the pivot device and movable to and from a position across the delivery end of the nozzle, said plate being frictionally held to the ear by the pivot device.

12. A nozzle support and sprayer, comprising upstanding nozzle-embracing legs having ears, a securing device passing through the ears and thus connecting the legs, and a sprayer plate pivotally mounted on the securing device and frictionally engaging the ears.

In testimony whereof I have hereunto signed my name in the presence of two subscribing witnesses at Los Angeles, in the county of Los Angeles and State of California, this 14th day of May 1910.

EMIL SUTHERLAND.

Witnesses:
 ALBERT H. MERRILL,
 FLORA H. FOSS.

Copies of this patent may be obtained for five cents each, by addressing the "Commissioner of Patents, Washington, D. C."